July 3, 1928.
C. G. WEINREICH
1,675,964
DEVICE FOR LOCATING SUBMERGED BODIES
Filed Sept. 14, 1925
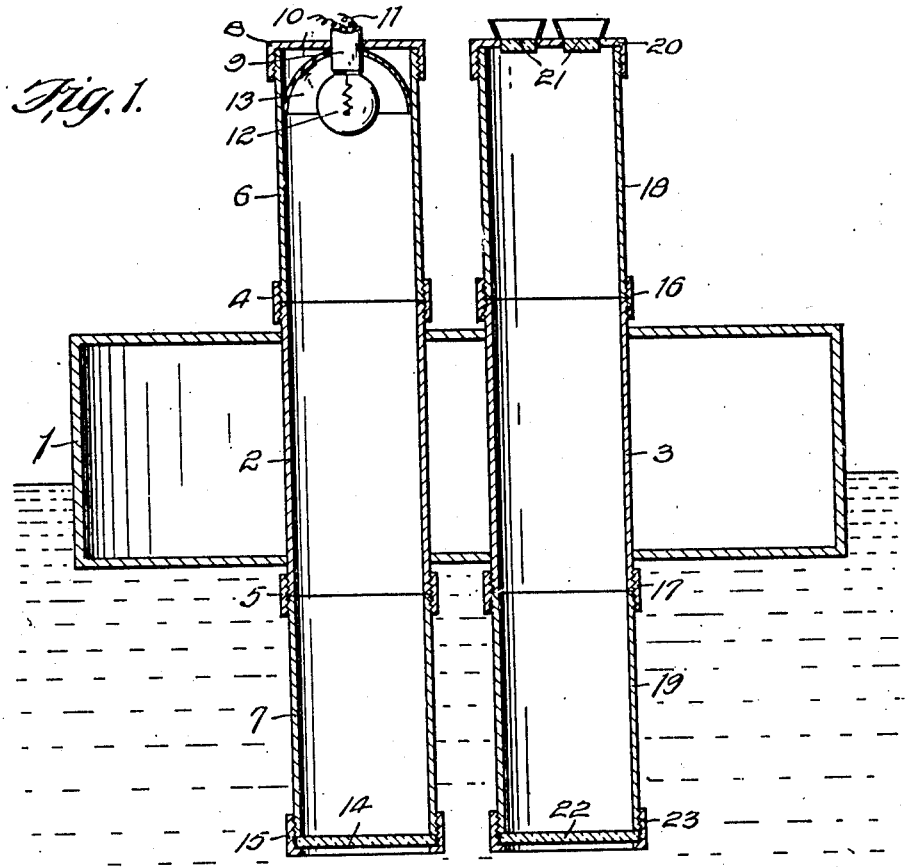
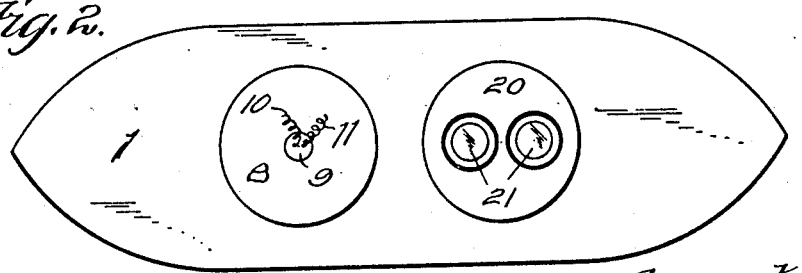
Inventor:
Christ G. Weinreich.
By Fred J. Charson
Attorney.

Patented July 3, 1928.

1,675,964

UNITED STATES PATENT OFFICE.

CHRIST G. WEINREICH, OF ST. LOUIS, MISSOURI.

DEVICE FOR LOCATING SUBMERGED BODIES.

Application filed September 14, 1925. Serial No. 56,227.

My invention relates to a device for locating submerged bodies, and it is a distinct and practical improvement to overcome certain practical objections to, and defects in, devices of that class.

The object of my present invention is to provide a device for scientific or other investigations under water.

A further object of the invention is to provide a device having two spaced tubes, one of which is provided with a searchlight at the upper end thereof above the water and a transparent closure at the lower end thereof in the water; while the other or observing tube is provided at its end with a powerful pair of sight lenses and at its lower end with a transparent closure.

A still further object of the invention is to provide a device wherein both the illuminating and sight tubes may be lengthened at either end by adding sections to the main tubes.

A still further object of the invention is the provision of a device for locating submerged bodies, which will possess advantages in points of simplicity and efficiency, and, at the same time prove itself comparatively inexpensive in manufacture.

With the other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1, is a vertical sectional view of a device embodying the features of my invention.

Fig. 2, is a top plan view thereof.

Referring to the accompanying drawings, the reference numeral 1 represents a suitable portable buoyant body. The buoyant body may also be a ship, if desired, or other suitable vessel which will float upon water. When the buoyant body 1 is portable, it may be of any suitable size and design so that it may be lowered overboard a vessel or used independent of a vessel, such as when making investigation beneath the surface of the ground in dark openings, or under water therein.

A pair of suitable main tube sections 2 and 3 are carried by the buoyant body 1 in suitable spaced relation. The tube sections pass through the buoyant body 1 and are suitably fixed thereto and may be of any suitable length and diameter. For the sake of illustration only, tube section 2 is shown as the illuminating tube and tube section 3 as the observation tube.

The upper and lower end of tube 2 is externally screw threaded to receive internally screw threaded coupling members 4 and 5, respectively.

The illuminating tube 2 is provided with an upper extension illuminating tube 6. The tube 2 has its upper and lower ends externally screw threaded and is connected at its lower end to the coupling member 5. The main illuminating tube section 2 is also provided with a lower extension illuminating tube 7. This tube has its upper and lower ends externally screw threaded and is connected at its upper end to the coupling member 5.

The upper end of the upper extension tube 6 is closed by means of a screw threaded cap 8. A suitable lamp socket 9 passes centrally through the cap 8 from which leads suitable conductors 10 and 11. An electric lamp 12 is carried by the lamp socket 9 within the illuminating tube at the upper end thereof. A suitable light reflector 13 is fixed to the lamp socket 9 to the rear of the lamp 12.

The lower end of the lower extension illuminating tube section 7 is closed by means of a glass closure 14 held from displacement by means of a screw threaded ring 15 carried by the lower end of the lower tube section.

If desired, the upper and lower extension tube sections may be eliminated and the cap 8 will be applied to the upper end of the main tube section 2 and also the illuminating means. In this instance, the glass closure and ring at the lower end of the lower extension tube is then applied to the lower end of the main illuminating tube section 2.

The upper and lower ends of the main observation tube section 3 is externally screw threaded to receive the internally screw threaded coupling members 16 and 17, respectively.

The main observation tube section 3 is provided with an upper extension observation tube section 18. This tube 18 has its upper and lower ends externally screw threaded and is connected at its lower end to the coupling member 16. The main observation tube section 3 is also provided with a lower observation tube section 19. The tube section 19 has its upper and lower ends externally screw threaded and is connected at its upper end to the lower coupling member 17.

The upper end of the upper observation tube section 18 is closed by means of a suitable screw threaded cap 20 and the cap 20 is provided with a pair of suitable lenses 21. The lower end of the lower observation tube section 19 is closed by means of a glass closure 22 held from displacement by means of a suitable flanged screw threaded ring 23 carried by the lower end of the lower tube section 19.

If desired, the upper and lower observation tube sections may be eliminated and the cap 20 and lenses 21 will then be applied to the upper end of the main observation tube section 3. In this instance, the glass closure and detaining ring at the lower end of the lower observation tube section is then applied to lower end of the main observation tube section 3.

The lower extension tube sections of the illuminating and observation tubes are only necessary when inspections are being made in deep water as the main tube sections are sufficient for shallow water.

The upper extension tube sections of both the illuminating and observation tubes are only necessary when the observers are positioned at a distance above the buoyant body 1 such as when the observers are aboard a vessel and the buoyant body 1 has been lowered overboard. When the observers are aboard the buoyant body 1 or are on a low vessel or other support, the main tube sections 2 and 3 will suffice.

From the arrangement and construction of illuminating and observation tubes, it is manifest that they may be as long or as short as desired by adding or removing the extension tube sections.

From the drawings and the foregoing description, it is evident that the portions of the illuminating and observation tubes extending below the buoyant body 1 and directed downwardly into the water, while the upper ends of the illuminating and observation tubes are directed above the buoyant body and above the water.

It is of course understood when inspections are being made into deep holes, or dark open spaces, that the upper illuminating and observing tube sections can be removed from their respective main tube sections.

The many advantages of the herein described invention will readily suggest themselves to those skilled in the art to which it appertains.

I do not wish to be understood as having limited myself to the exact details of construction and arrangement of parts as herein described and illustrated, as it is manifest that variations and modifications may be made without departing from the spirit and scope of my invention, and the terms of the following claims, hence I wish it to be understood that I reserve the right to make any such changes, or modifications, as may fairly fall within the scope of the appended claims when fairly construed.

What I claim is:

1. In a device for locating submerged bodies, a buoyant member, a tube passing through said buoyant member and fixed thereto, a closure for the upper end of said tube, a lamp supported below said closure, a reflector positioned behind said lamp, a transparent closure for the lower end of said tube, a second tube passing through said buoyant member and fixed thereto in spaced parallel relation to the first mentioned tube, a closure for the upper end of said second tube, lenses carried by said closure and a transparent closure for the lower end of said second tube.

2. In a device for locating submerged bodies, a buoyant member, a tube consisting of a plurality of removably connected sections supported by said buoyant member and directed above and below said buoyant member, illuminating means positioned within the upper end of the tube, a transparent closure for the lower end of said tube, a second tube consisting of a plurality of removably connected sections supported by said buoyant member and directed above and below said buoyant member, lenses carried at the upper end of said second tube and a transparent closure for the lower end of said second tube.

3. In a device for locating submerged articles, a buoyant body, a straight sectional lighting tube of the same diameter throughout its length, fixed to and passing through said body so as to extend above and below the same, a closure cap for the upper end of said tube, a lamp carried within the upper end of said tube, a reflector between the lamp and the closure cap, a transparent closure for the lower end of said tube, a flanged ring for retaining the transparent closure in position, a straight sectional independent observation tube of the same diameter throughout its length fixed to and passing through said body in spaced parallel relation to the lighting tube and extending above and below said body, a closure cap fixed to the upper end of the observation tube, a lense carried by said closure cap, a transparent closure for the bottom of said observation tube and a flanged ring for retaining said transparent closure in position.

In testimony whereof, I have hereunto signed my name to the specification.

CHRIST G. WEINREICH.